J. J. SINGLETON.
Fertilizer Distributer.
No. 108,196. Patented Oct. 11, 1870.
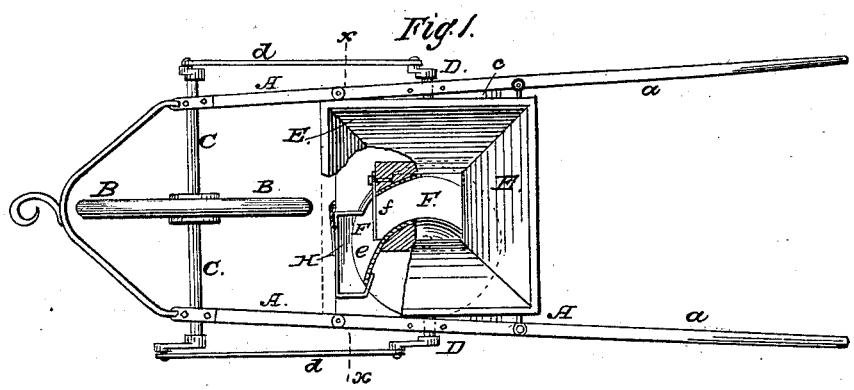
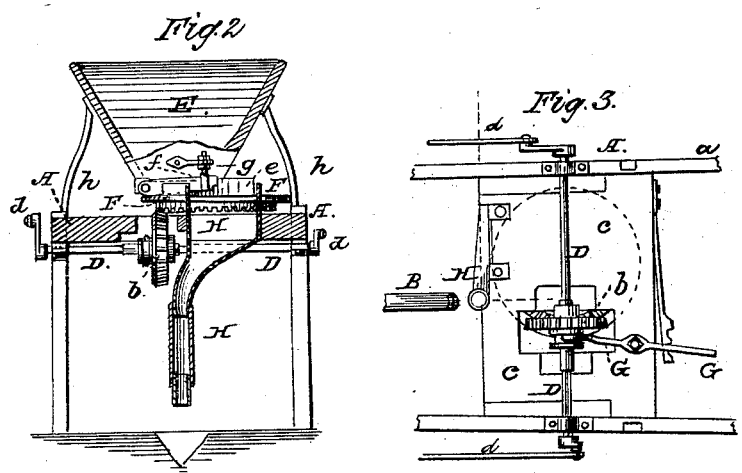
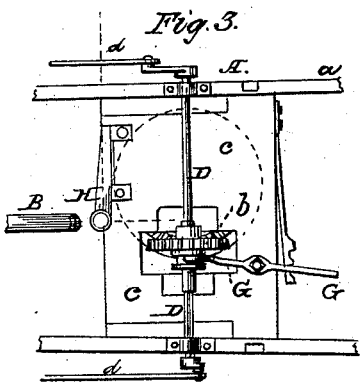
Witnesses:
L. S. Mabee
David Misell
Inventor:
J. J. Singleton
per Munn & Co.
Attorneys.

United States Patent Office.

JOSEPH J. SINGLETON, OF FORSYTH, GEORGIA.

Letters Patent No. 108,196, dated October 11, 1870.

IMPROVEMENT IN FERTILIZER DISTRIBUTERS.

The Schedule referred to in these Letters Patent and making part of the same.

*To all whom it may concern:*

Be it known that I, JOSEPH J. SINGLETON, of Forsyth, in the county of Monroe and State of Georgia, have invented a new and improved Distributer of Fertilizers; and I do hereby declare that the following is a full, clear, and exact description thereof, which will enable others skilled in the art to make and use the same, reference being had to the accompanying drawing forming part of this specification, in which—

Figure 1 represents a plan or top view, partly in section, of my improved fertilizer distributer.

Figure 2 is a vertical transverse section of the same, taken on the plane of the line $x\,x$, fig. 1.

Figure 3 is an inverted plan view of the same.

Similar letters of reference indicate corresponding parts.

This invention relates to a new apparatus for distributing guano and other fertilizing matter, and for drilling small grains and seeds.

The invention consists chiefly in the use of a horizontal distributing-wheel or disk, and in the connection therewith of a regulating gate and discharge-tube, as hereinafter more fully described.

A in the drawing represents the frame of the fertilizer. Its front end is supported by a wheel, B, which is mounted upon a crank-axle, C.

The rear end of the frame A terminates in handles *a a*.

The axle C has its bearings in the front part of the frame A.

Another horizontal shaft D is hung transversely in the frame A, below the hopper E, that is supported by said frame.

Upon the shaft D is mounted a toothed wheel, *b*, meshing into teeth that project from the under side of a horizontal disk, F.

This disk is arranged under the hopper, forming the bottom of the same, as shown, that is to say, the disk is pivoted upon a platform, *c*, and with one section fits under the hopper, to close the same at the bottom.

The shafts C and D are provided with cranks, and connected by rods *d*, so that the motion of the wheel B will cause the shaft D and disk F to rotate.

The wheel *b* is connected with a clutch and lever, G, so that it can readily be thrown out of gear for arresting the motion of the disk F.

The lower part of the hopper is so shaped as to form a segmental opening. The inner edge of the same is formed by a plate, *e*, which is continued beyond the hopper, as shown in fig. 1, to form a portion of the inclosure of the discharge-pipe into which the material is carried.

The lower part of the hopper is open in front, and provided with a swinging gate, *f*.

The gate is connected by a screw-bolt and nuts *g* with a lug, that projects from the from the front of the hopper, and can consequently be adjusted up or down at will, to regulate the discharge of material from the hopper.

The revolving disk carries the seed or fertilizing material gradually from the hopper to beyond the gate *f*.

The scraper *e* serves to remove the material from the disk, and to convey it to the upper opening of the discharge-tube H, which is flexible, and deposits the seed or fertilizer to the ground.

The inward-bent end of the gate *f* may have a recess cut out from its lower part, to allow stones and large lumps to pass through it.

The machinery for rotating the disk may be varied at pleasure, and does not form part of my invention.

A sieve may be placed into the hopper to prevent large lumps from passing through the gate.

The hopper is supported on braces *h h*, and is thereby elevated so as not to rest upon the disk F.

Having thus described my invention,

I claim as new and desire to secure by Letters Patent—

1. The horizontal disk F, arranged under the hopper, to discharge the contents of the same into the tube H, substantially as herein shown and described.

2. The adjustable gate *f*, applied to the hopper, in combination with the disk F, and scraper *e*, substantially as herein shown and described.

JOSEPH J. SINGLETON.

Witnesses:
F. O. MAYS,
JOHN B. TURNER.